W. F. L. FISCH.
BREAD MAKING APPARATUS.
APPLICATION FILED APR. 10, 1917. RENEWED MAR. 22, 1920.
1,345,079.
Patented June 29, 1920.
4 SHEETS—SHEET 4.
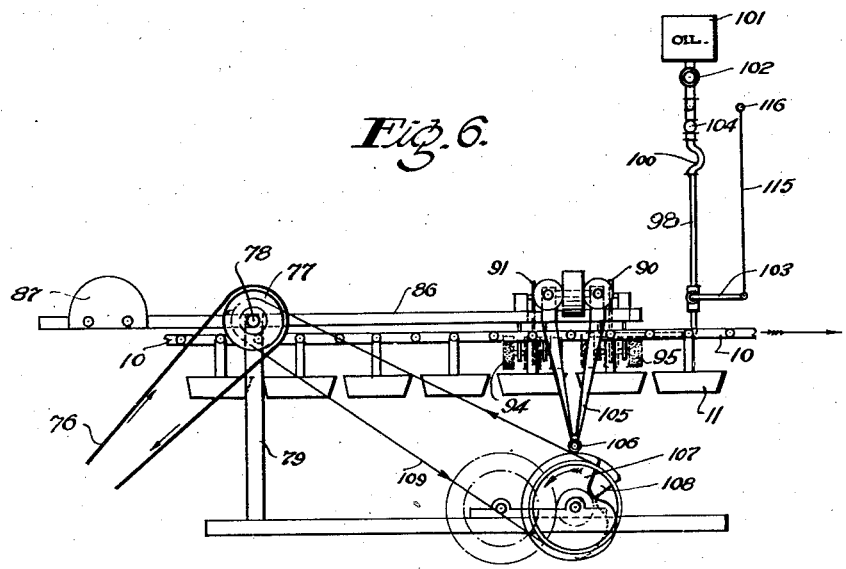
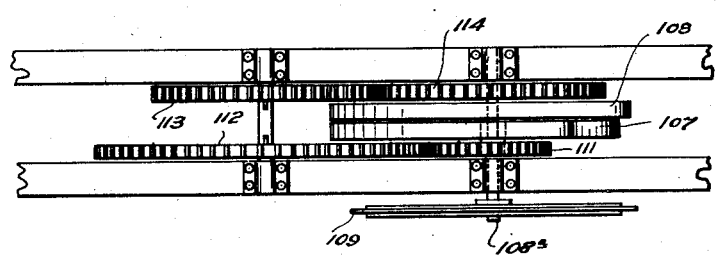

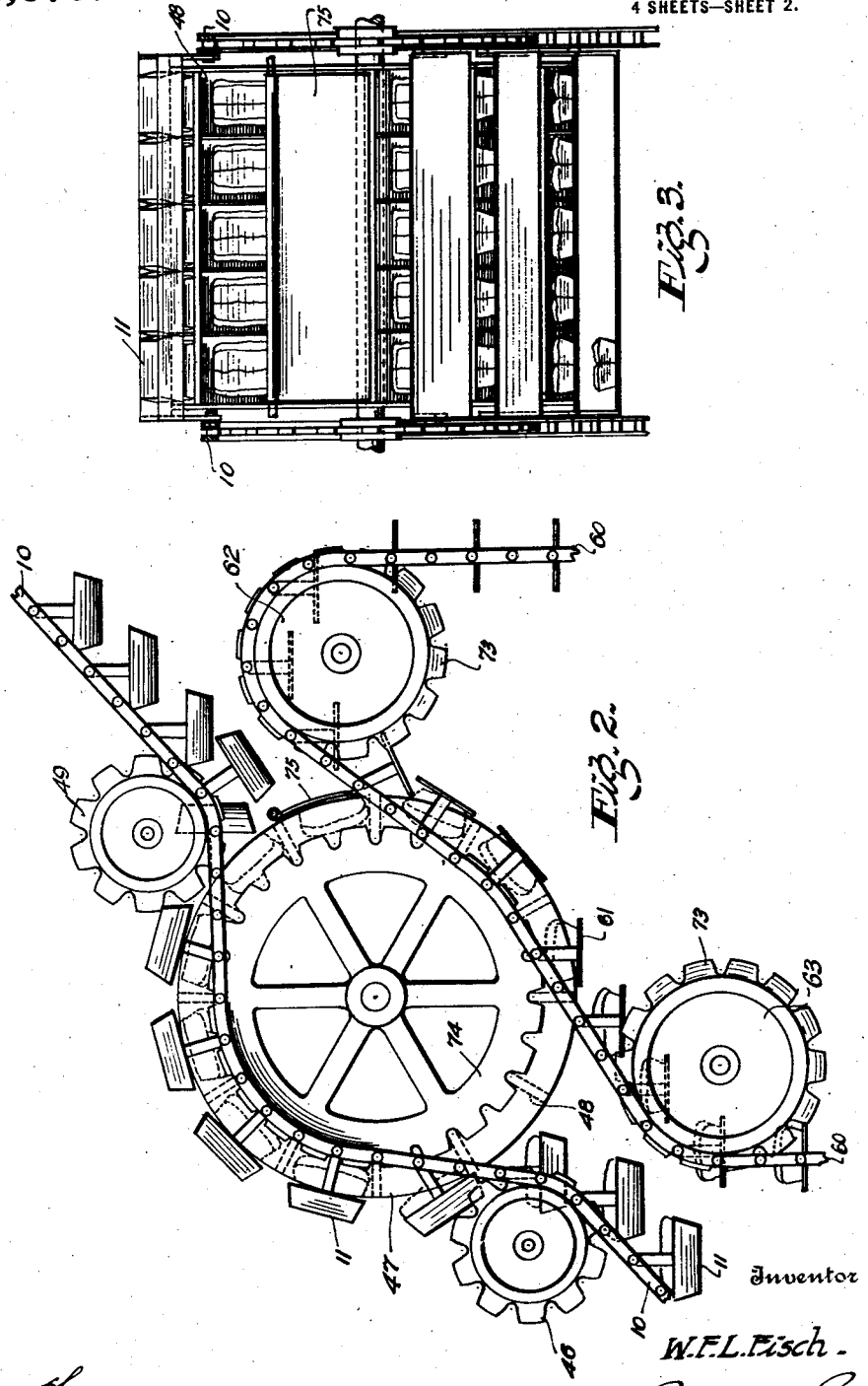

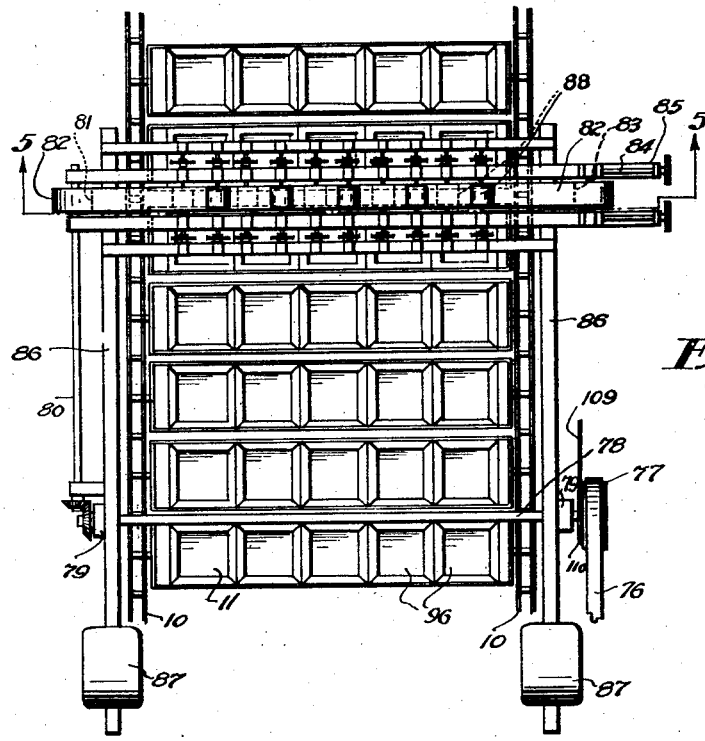

UNITED STATES PATENT OFFICE.

WILLIAM F. L. FISCH, OF BIRMINGHAM, ALABAMA.

BREAD-MAKING APPARATUS.

1,345,079.        Specification of Letters Patent.    Patented June 29, 1920.

Application filed April 10, 1917, Serial No. 161,064. Renewed March 22, 1920. Serial No. 367,893.

*To all whom it may concern:*

Be it known that I, WILLIAM F. L. FISCH, a citizen of the United States of America, residing at Birmingham, in the county of Jefferson and State of Alabama, have invented certain new and useful Improvements in Bread-Baking Apparatus, of which the following is a specification.

My invention relates to an apparatus for the manufacture of loaves of bread which is more particularly adapted to produce loaves of bread of a given size and shape at a minimum cost of labor and space occupied.

My present invention contemplates the use of two correlated endless chains or conveyers, one having suspended at intervals therefrom the bread molds or pans and this conveyer is adapted to pass successively from an apparatus which charges it with the dough through a proofing cabinet or chamber, and a baking oven to a transfer mechanism where the baked loaves are transferred to shelves on the other conveyer. The baking and proofing conveyer continues from the transfer mechanism to a cooling apparatus, and thence to a cleansing and greasing apparatus, after which it is again charged with dough and the operation repeated. The other endless conveyer carries hanging shelves which receive the baked loaves from the transfer mechanism and conduct the same through a cooler, wherein the bread is cooled and dried under accurate and scientific control by means of an air blast, and from which the shelves are returned to the transfer mechanism. In this manner the entire operation is mechanically performed and all manual handling avoided.

My invention comprises improvements in the construction, arrangement and operation of the proofing chamber and of the bread cooling chamber, and also of the cooling apparatus for the pans. I have conceived a novel automatic mechanism for cleaning and oiling the bread pans while in motion.

Another feature of my invention is the construction of the transfer mechanism which comprises a rotary transfer drum having pockets in its periphery and sprockets which coöperate with both endless conveyers in such manner that as the baked loaves are dumped from the bread pans into the drum pockets they will be automatically transferred in position right side up upon the shelves of the conveyer which will conduct them through the cooling apparatus.

My invention comprises many other details of construction and arrangements of parts which in their preferred embodiment only are illustrated in the accompanying drawings, wherein:—

Figs. 2 and 3 are end and front elevations of the transfer mechanism.

Fig. 4 is a plan view of the endless conveyer carrying the bread pans or molds and showing the cleaning and oiling apparatus in plan.

Fig. 5 is a sectional view taken on the line 5—5 of Fig. 4.

Fig. 6 is an end elevation of the apparatus for cleaning and greasing the pans and shows the trip mechanism which, in enlarged plan, is shown in Fig. 7.

Similar reference numerals refer to similar parts throughout the drawings.

Figure 1:
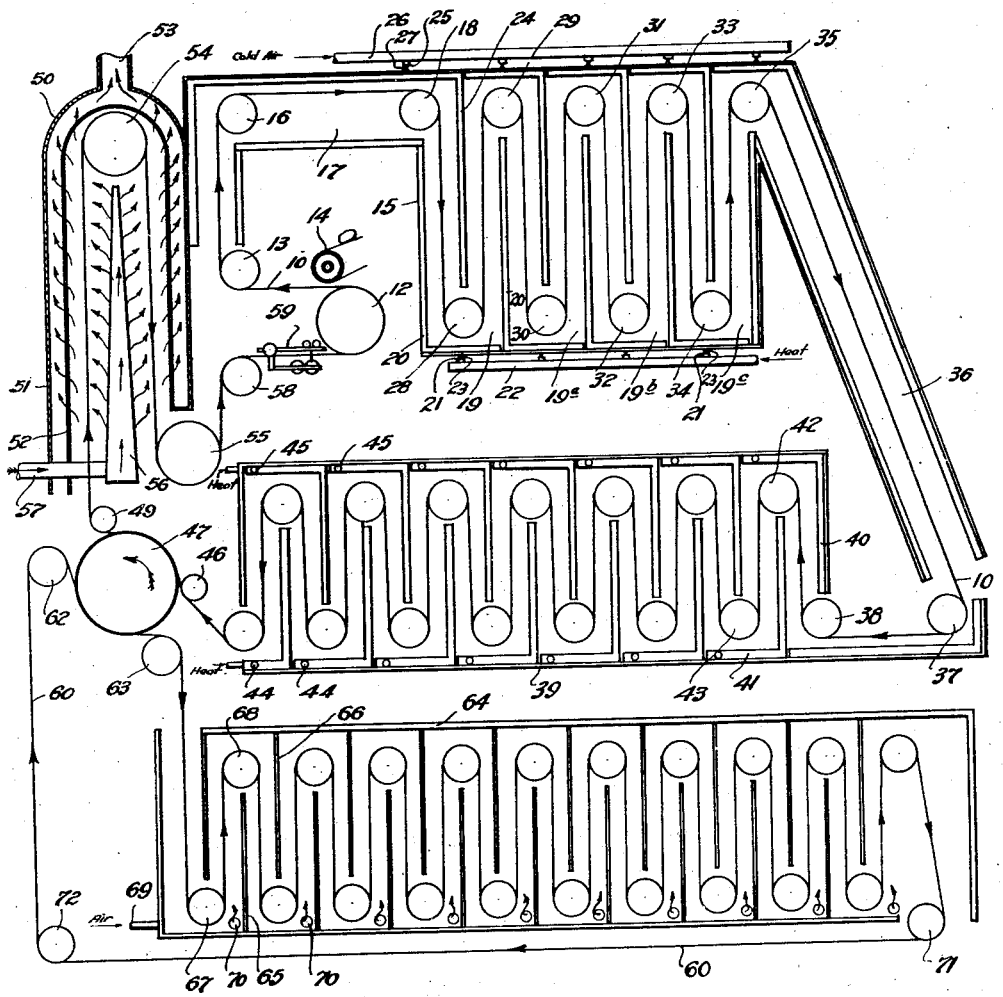
Figure 1 illustrates in vertical section the proofing, baking and cooling apparatus, and also the pan cooling apparatus, while the transfer and the oiling and cleaning mechanisms are diagrammatically illustrated.

In the embodiment of my invention, illustrated diagrammatically in Fig. 1, I employ one endless conveyer 10 which carries bread molds or baking pans 11 suspended therefrom so as to always hang vertically. This conveyer passes about a pulley 12 to a pulley 13 and between these points, by an apparatus 14 formally illustrated, dough is fed into the molds or pans 11 which thereupon pass into the proofer indicated generally at 15 and comprising a vertical compartment through which the conveyer passes upwardly to a pulley 16 and thence horizontally through a compartment 17 to a pulley 18. From this point on, the proofer is divided into a series of similar connecting compartments 19, 19$^a$, 19$^b$ and 19$^c$, and it will be noted that there may be as many of these compartments as may be desired. Each compartment has its side and bottom walls formed by an L-shaped casing 20 which is hollow and connected by a pipe 21 to a steam or heating main 22, a valve 23 being provided in each pipe 21 to control the supply of steam to the hollow casing 20. An inverted L-shaped casing 24 forms part of the top and a downwardly extending partition which stops short of the bottom of the compartment. This casing 24 is also hollow and has a connecting pipe 25 opening into a cool-air duct 26 and controlled by a valve 27. The conveyer passes downwardly in the first compartment to a pulley 28 disposed under the partition wall 24 and passes around it and thence upwardly between the said partition and the adjacent casing 20 to a pulley 29 and so on successively to the pulleys 30, 31, 32, 33, 34, to the pulley 35, making a zig-zag travel through the proofing chamber of such a length that the proofing or rising of the dough is completed therein, after which the conveyer passes down through an inclined leg 36 to a pulley 37 and about this to a pulley 38 at the entrance to the baking oven designated generally by the numeral 39.

This baking oven is formed by L-shaped hollow walls 40 and 41 so arranged as to form a continuous zig-zag baking chamber through which the conveyer passes over a series of upper pulleys 42 and lower pulleys 43 until it leaves the oven. The hollow wall members 40 and 41 are independently supplied with a heating medium through ports 44 and 45, respectively, so that the heat of the walls can be regulated in any suitable manner, such for instance as is described and claimed in my pending application Serial No. 45,708.

After emerging from the baking oven with the loaves baked, the conveyer passes under a pulley 46 and engages a transfer drum 47 which is provided with bread pockets 48, see Fig. 2, into which the loaves of bread fall from the bread molds or pans in which they are baked as the latter are inverted in passing over the transfer drum, thence the conveyer and empty pans pass around a pulley 49 into a pan cooling apparatus designated generally by the numeral 50. This apparatus comprises a double casing having outer solid walls 51 and an inner inverted U-shaped perforated wall 52, the chamber inclosed in the wall 52 being provided with an air escape 53 to a chimney or air duct, not shown. The conveyer passes upwardly from the pulley 49 to a large pulley 54 at the top of the cooler and thence downwardly to a pulley 55. Between the flights of the conveyer in the cooler, I provide an air blower 56, connected by a pipe 57 with an air source for supplying cold air under pressure and the blower is provided with ports on either side from which the blasts of air escape against the conveyer and pass therethrough and through the perforated wall 52 to the escape duct 53. By this arrangement the conveyer and pans will be brought to the right temperature when in position to receive another charge of bread. The cooled conveyer passes over a pulley 58 and under a pan cleaning and greasing apparatus designated generally by the numeral 59 to the pulley 12 and thence to the point where it is again charged with dough. This completes the endless travel of the conveyer 10 which carries the dough through the rising and baking processes.

I provide a second endless conveyer 60 having suspended therefrom so as to hang in vertical position swinging shelves 61. This conveyer passes over a pulley 62 to a pulley 63 on opposite sides of the transfer drum 47, these pulleys being so arranged that the conveyer will engage the transfer drum 47 on the opposite side from and pass in the opposite direction to the proofing and baking conveyer 10. The shelves to the storage conveyer will automatically go in place over the bread pockets in the transfer drum and as the conveyer and drum move on the bread will be deposited in upright position on the shelves 61.

The conveyer 60 thus loaded will pass in and through a storage and cooling room generally designated by the numeral 64 and divided by vertical partitions 65 and 66 in much the same fashion as the proofing and baking compartments as to form a zig-zag passage having a bottom series of pulleys 67 and a top series of pulleys 68, about which the conveyer is guided in its passage. It is not however necessary to use double walls for the partitions and sides of the several compartments of this cooling and storage room, but I prefer to provide an air duct 69 leading from a blower and adapted to deliver air of the proper temperature, humidity and purity through ports 70 into each compartment, it being important while the bread is cooling to subject it only to pure air to avoid its absorption of impurities. The conveyer 60 passes out of the far end of the cooling room over a pulley 71 and returns to a pulley 72 and thence back to the pulley 62, thus completing its circuit.

Both conveyers 10 and 60 are formed of two sprocket chains and the pans 11 and shelves 61 are of the same length and pivotally connected by hangers to the sprocket chains. The several pulleys 62, as shown in Fig. 2, have sprocket teeth 73 and the transfer drum has at each end a sprocket wheel 74 of less diameter than the drum so that the links of the conveyer chains in swinging to engage these sprocket wheels 74 will draw the pans or the shelves, as the case may be, against the open pockets of the drum. This sprocket arrangement keeps the conveyers in proper relative relationship so that the pans and the shelves will successively come over the pockets on opposite sides of the transfer drum. The pans 11 are gradually turned upside down to discharge the bread into the pockets 48. A shield 75, Fig. 2, holds the bread in the pockets as they approach discharging position until the shelf intended to receive the bread therefrom is in position to prevent the bread falling out.

In order that a continuous conveyer carrying the bread pans or molds connected thereto can be used, it is desirable to provide an apparatus which will clean and grease the pans or molds while the conveyer is in motion. To this end I provide the apparatus disclosed more clearly in Figs. 4 to 7, wherein it will be seen that a power belt 76, by means of a pulley 77, drives a countershaft 78 which is mounted in bearings 79 above the conveyer. The shaft 78, by means of beveled gearing, drives a shaft 80 parallel with the conveyer and having a pulley 81 thereon which drives an endless belt 82 which passes above the conveyer 10 to a tension pulley 83 controlled by an adjusting screw 84, both pulleys being mounted in a frame 85 which is carried by pivoted arms 86 having their axes concentric with the pulley 77 and extending beyond the same to receive counterweights 87. After passing the pulley 83 the belt passes alternately over and under a series of small pulleys 88, each of which is fast on the center of a short shaft 89, parallel with the conveyer and carrying at opposite ends sprockets or pulleys 90 and 91. Each of these pulleys, by means of a separate belt 92, will serve to drive a shaft 93. Each shaft 93, corresponding in length substantially to the width of the pans or molds, carries thereon cleaning or oiling brushes. The cleaning brushes are designated as 94, and three of them are arranged on one set of shafts 93 and they are disposed normally above the top of the molds. The oiling brushes 95 are similarly arranged on the other set of shafts 93. As seen in Fig. 5, two sets of oiling or cleaning brushes are arranged for each bread mold, which I indicate as 96. Between each set of oiling brushes for each mold 96, I provide an oiling spray nozzle 97. The several nozzles are connected in manifold by pipes 98 and flexible hose pipes 100 to a supply pipe 99 leading from the oil tank 101. The pipe 99 has a main valve 102 near the tank and each pipe 98 has therein a trip valve 103 normally held in closed position. Individual valves 104 regulate the supply of oil to each spray. The swinging frame carrying the cleaning and oiling apparatus is supported by a pendent bracket 105 having a bottom roller 106 which rides normally upon the periphery of a pair of cams 107 and 108 which are similar and designed as shown in Fig. 6, the cam 107 being made fast on a shaft 108ᵃ driven by a belt or chain 109 from a pulley or sprocket wheel 110 driven by the pulley 77. A gear wheel 111 is also fast on the shaft 108ᵃ and this gear, through a train of gearing 112, 113 and 114, will drive the cam 108 at a speed ratio of about 1 to 4 relatively to the cam 107. The roller 106 is wide enough to engage both cams and it thus follows that the frame is supported at all times except when the notches of the two cams are coincident when passing under the roller. The gearing and arrangement is such that this takes place at intervals which will drop the brushes momentarily into the pans as they are successively moved into position under it and the more rapidly moving cam will lift the brushes quickly out before the slowly moving bread conveyer has fouled them. The drop of the oiling apparatus will automatically open the oil supply valves 103 as each is connected by a rod 115 to a fixed pivot 116, so that a spray of oil will be delivered to each pan or mold and distributed thereover by the brushes 95.

Any suitable apparatus may be employed for delivering the dough batches into the pans or molds after they have been cleaned and oiled.

My reason for using the two cams 107 and 108 for operating the pan cleaning and greasing mechanism is that I am enabled by driving these two at different ratios of speed to permit one to move very slowly in synchronism with the baking conveyer so as to form the master control cam while the other is driven more rapidly than the master control cam and will thus be adapted to drop and raise the cleaning and oiling mechanism with a rapid action. This rapid action is essential for producing the best results from the cleaning and oiling device and to avoid contact with the sides of the mold and it would be quite difficult to obtain the necessary rapidity of action from a cam moving synchronously with the slowing traveling conveyer.

This invention is not intended to be restricted in scope to the specific embodiment shown, but contemplates such modifications as come within the spirit and scope of the claims.

Having thus described my invention, what I claim as new and desire to secure by Letters Patent, is:—

1. In a bread making plant, the combination consisting of proofing and baking chambers, a conveyer passing circuitously through the proofing and baking chambers, bread baking pans connected to and movable with the conveyer through both chambers, and a pan greasing apparatus adapted to act on the pans in their travel from the baking to the proofing chamber.

2. In a bread making plant, the combination consisting of proofing and baking chambers, a conveyer passing circuitously through both chambers and carrying baking pans, means to deliver bread to the pans in advance of the proofing chamber, means to discharge the bread from the pans as they emerge from the baking chamber, and instrumentalities for cooling, cleaning and greasing the pans disposed to act thereon in the passage of the pans from the baking to the proofing chamber.

3. In a bread making plant, the combination consisting of proofing, baking and cooling chambers for the bread, one conveyer passing circuitously through the baking and proofing chambers, another conveyer passing circuitously through the cooling chamber, bread supporting elements carried by said conveyers, and a transfer mechanism for automatically transferring the baked bread from the baking to the cooling conveyer, substantially as described.

4. In a bread making plant, a baking chamber, a bread cooling chamber, an endless conveyer traveling through the baking chamber and carrying baking pans, a second endless conveyer traveling through the cooling chamber and carrying bread supporting shelves, and a means for automatically transferring the baked loaves of bread from the pans of the first conveyer to the shelves of the second conveyer, substantially as described.

5. In a bread making plant, the combination of an endless conveyer carrying bread molds hinged thereto, a baking chamber through which said conveyer passes circuitously a second conveyer carrying bread shelves, a transfer drum over which the baking conveyer passes and which has pockets to receive the bread from said conveyer, said other conveyer being also adapted to engage the transfer drum in position to present its shelves successively to receive the bread from the drum pockets.

6. In a bread making plant, a rotatable transfer drum having bread pockets about its periphery and one or more sprocket wheels, two conveyers, each having a sprocket chain to engage said sprocket wheels to synchronize their movements relatively to that of the drum, and guides for said conveyers being disposed to cause each to pass only partway about the drum and at different points, bread pans carried by one conveyer and adapted to be inverted in their passage over the drum to discharge the baked bread into the drum pockets, and shelves carried by the other conveyer and movable therewith into position over the pockets containing the bread and adapted to travel with the drum until the bread is delivered thereonto, substantially as described.

7. In a bread making plant, an endless baking conveyer having baking molds incorporated therewith, a cleaning and oiling aparatus for the molds comprising rotatable cleaning brushes and oiling brushes, means to supply oil to the oiling brushes, means to drive the cleaning and oiling brushes, and means moving synchronously with the conveyer for bringing the mechanisms temporarily into engagement with the molds as they successively approach, substantially as described.

8. In a bread making plant, an endless baking conveyer carrying attached baking pans and having a slow continuous movement, a pan cleaning means disposed normally out of the path of the pans, and means synchronized with the conveyer for moving the cleaning means with a quick motion into and out of engagement with each moving pan as it passes.

9. In a bread making plant, an endless baking conveyer carrying attached pans and having a slow continuous movement, a pan cleaning means having a movable support and disposed normally above the flight of the pans to be cleaned, means driven in synchronism with the conveyer for controlling the movement of the cleaning means into and out of engagement with the pans, said means comprising a pair of cams, means for driving them at different speeds, said cams having notches which register at a critical point as each pan arrives under the cleaning means, and a supporting arm for the cleaning means which rides on both cams and drops into the notches therein when in register at said critical point to lower the cleaning means into operating position.

10. In a bread making plant, an endless baking conveyer carrying attached bread pans, an oiling apparatus therefor comprising a reciprocable frame, distributing means carried by the frame, oil feeding means movable with the frame, means driven synchronously with the conveyer for bringing the distributing means into engagement with the pans, and an oil feeding valve mechanism automatically opened and closed by the movement of the feeding means into and out of engagement with the pans, substantially as described.

11. In a bread making plant, an endless baking conveyer carrying attached pans, an oiling apparatus therefor comprising oil distributing mechanism, means to bring the mechanism into engagement with the successive pans, an oil distributing apparatus movable in part with the oiling means and having a flexible connection which permits such movement, a feed valve for the oil, and a rod having a fixed pivot at one end and pivotally connected to the valve at the other and disposed to open the valve automatically as the distributing means moves into engagement with the pan, and to close the valve automatically as the distributing means moves out of engagement with the pans, substantially as described.

12. In a bread making plant, a cooling chamber having staggered vertical partitions therein, a conveyer, means to pass the conveyer in a circuitous course about said partitions through the cooler, bread supports carried by the conveyer and adapted to receive the baked bread, and means to deliver cooled pure air by a forced draft into different subdivisions of the cooling chamber, as and for the purposes described.

13. In a bread making plant, the combination consisting of proofing and baking chambers, a continuously driven conveyer passing circuitously through the proofing and baking chambers, bread baking pans connected to and movable with the conveyer in continuous flight through both chambers, and an automatic pan cleaning apparatus disposed between and outside of both of said chambers and adapted to act on the pans while in movement from the baking to the proofing chamber.

14. In a bread making plant, a pan cooling apparatus for an endless flight of baking pans comprising a multiported air nozzle, a jacket about the nozzle having an outlet for the air, means to supply air under pressure to the nozzle, and pulleys to guide the flight of pans through the jacket and about the nozzle and expose the pans successively to the jets of air therein, as and for the purposes described.

In testimony whereof I affix my signature.

WILLIAM F. L. FISCH.

Witness:
NOMIE WELSH.